US 8,050,455 B2

(12) United States Patent
Noh et al.

(10) Patent No.: US 8,050,455 B2
(45) Date of Patent: Nov. 1, 2011

(54) PHOTOGRAPHING APPARATUS AND METHOD FOR CONTROLLING TARGET TRACKING

(75) Inventors: Seung-in Noh, Goyang-si (KR); Jin-keun Seo, Seoul (KR); Suk-ho Lee, Seoul (KR); Hyun-gun Woo, Seoul (KR)

(73) Assignee: Samsung Techwin Co., Ltd., Changwon (KR)

( * ) Notice: Subject to any disclaimer, the term of this patent is extended or adjusted under 35 U.S.C. 154(b) by 1182 days.

(21) Appl. No.: 11/806,751

(22) Filed: Jun. 4, 2007

(65) Prior Publication Data
US 2008/0101655 A1    May 1, 2008

(30) Foreign Application Priority Data

Oct. 25, 2006   (KR) ................. 10-2006-0104195

(51) Int. Cl.
*G06K 9/00* (2006.01)
(52) U.S. Cl. ............................ 382/103; 348/169
(58) Field of Classification Search .................. 382/103, 382/173; 348/169; 352/39
See application file for complete search history.

(56) References Cited

U.S. PATENT DOCUMENTS

| 5,604,821 | A  | * | 2/1997 | Ranganathan et al. | 382/236 |
| 7,313,254 | B2 | * | 12/2007 | Lee et al. | 382/103 |
| 7,728,909 | B2 | * | 6/2010 | Poon | 348/451 |
| 2003/0035051 | A1 | * | 2/2003 | Cho et al. | 348/169 |
| 2003/0063669 | A1 | * | 4/2003 | Lee et al. | 375/240.08 |
| 2005/0033505 | A1 | * | 2/2005 | Zatz | 701/117 |
| 2005/0185824 | A1 | * | 8/2005 | Chen | 382/103 |

FOREIGN PATENT DOCUMENTS

| KR | 100137923 | 2/1998 |
| KR | 1020030013092 | 2/2003 |

OTHER PUBLICATIONS

Suk-Ho Lee and Jin Keun Seo, Level Set-Based Bimodal Segmentation with Stationary Global Minimum, IEEE Transactions on Image Processing, vol. 15, No. 9, Sep. 2006.

* cited by examiner

*Primary Examiner* — Jason M Repko
*Assistant Examiner* — Shervin Nakhjavan
(74) *Attorney, Agent, or Firm* — Sughrue Mion, PLLC (57) ABSTRACT

A photographing apparatus and a method for controlling target tracking are provided. The photographing apparatus includes a target extractor for extracting target information in a present frame based on the difference between a pixel value of one pixel among previous pixels constituting the target of the previous frame in an area adjacent to the present pixel constituting the present frame and a pixel value of the present pixel, and a tracking controller for controlling automatic tracking for the target based on the target information. Accordingly, the target can be extracted more precisely.

22 Claims, 3 Drawing Sheets

PHOTOGRAPHING APPARATUS AND METHOD FOR CONTROLLING TARGET TRACKING

CROSS-REFERENCE TO RELATED APPLICATIONS

This application claims the benefit under 35 U.S.C. §119 (a) of Korean Patent Application No. 10-2006-104, filed in the Korean Intellectual Property Office on Oct. 25, 2006, the entire disclosure of which is hereby incorporated by reference.

BACKGROUND OF THE INVENTION

1. Field of the Invention

The present invention relates to a photographing apparatus and method. More particularly, the present invention relates to a photographing apparatus for automatically tracking a moving target and maintaining photographing of the moving target.

2. Description of the Related Art

Developments in image processing technology and photographing technology, have improved the automatic control of a photographing apparatus for automatically tracking a moving target without directly manipulating the photographing apparatus by users. Tracking technologies similar to this continue to develop.

Tracking is performed by extracting a moving target from a captured image and then automatically controlling the photographing apparatus to center the extracted target on the image.

The process of extracting the moving target is performed by analyzing the captured image; however, many errors occur during this process. One such error is extracting an incorrect target, and another is incorrectly determining the area in the background to be a target. Such errors occur frequently when there is a moving object other than the target in the captured image.

Accordingly, there is a need for a photographing apparatus and method which improve the precision at which a target can be tracked by more precisely extracting the target.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a photographing apparatus and method for more precisely extracting a target using an image difference generated by comparing the target and background of the current frame and previous frame.

Another aspect of exemplary embodiments of the present invention is to provide a photographing apparatus and method for improving the precision at which a target is extracted based on the similarity of the target and background of the current frame and previous frame.

Yet another aspect of exemplary embodiments of the present invention is to provide a photographing apparatus and method for more precisely extracting a target by excluding an area determined to be a background from an area determined to be a target in the current frame.

In order to achieve the above-described aspects of exemplary embodiments of the present invention, a photographing apparatus is provided comprising a target extractor and a tracking controller. The target extractor extracts information regarding a target in a present frame based on information regarding a difference between a pixel value of one pixel among previous pixels constituting the target of the previous frame in an area adjacent to the present pixel constituting the present frame and a pixel value of the present pixel. The tracking controller controls automatic tracking for the target based on the information regarding the target.

According to an exemplary implementation, the target extractor comprises a target-difference image generator. The target-difference image generator generates a target-difference image by modifying the pixel value of the present pixel to the difference between the pixel value of the present pixel and a pixel value most similar to the pixel value of the present pixel among the pixel values of the previous pixels constituting the target of the previous frame in the area adjacent to the present pixel. The target extractor extracts the information regarding the target in the present frame based on the target-difference image.

In an exemplary implementation, the target-difference image generator generates the target-difference image by modifying the pixel value of the target-difference image for the present pixel to a preset pixel value, if the target of the previous frame is not in the area adjacent to the present pixel.

In an exemplary implementation, the target extractor further comprises a target-difference image divider for generating a target-segment by dividing an area from the target-difference image based on the size of the pixel values of the pixels constituting the target-difference image. The target extractor extracts the information regarding the target in the present frame based on the target-segment.

In another exemplary implementation, the target-difference image divider generates the target-segment by dividing pixels that have a pixel value less than a first pixel value from the target-difference image.

In yet another exemplary implementation, the target-difference image divider regenerates the target-segment by dividing pixels that have a pixel value less than a second pixel value from the pixels constituting the target-segment.

In an exemplary implementation, the target extractor comprises a background-difference image generator for generating a background-difference image by modifying the pixel value of the present pixel to the difference between the pixel value of the present pixel and a pixel value that is most similar to the pixel value of the present pixel among the pixel values of the previous pixels constituting the background of the previous frame in the area adjacent to the present pixel. The target extractor also extracts the information regarding the target in the present frame based on the target-difference image and the background-difference image.

According to an exemplary implementation, the target extractor further comprises a target-difference image divider, a background-difference image divider and a target reconstructor. The target extractor generates a target-segment by dividing an area from the target-difference image based on the size of the pixel values of the pixels constituting the target-difference image. The background-difference image divider generates a background-segment by dividing an area from the background-difference image based on the size of the pixel values of the pixels constituting the background-difference image. The target reconstructor outputs the information regarding the target by excluding the pixels constituting the background-segment from the pixels constituting the target-segment.

In order to achieve the above-described aspects of exemplary embodiments of the present invention, a method for controlling target tracking is provided. Information regarding a target is extracted in a present frame based on a difference between a pixel value of one pixel among previous pixels constituting the target of the previous frame in an area adjacent to the present pixel constituting the present frame and a pixel value of the present pixel. Automatic tracking for the target is controlled based on the information regarding the target.

According to an exemplary embodiment of the present invention, the information regarding the target is extracted by generating a target-difference image by modifying the pixel value of the present pixel to the difference between the pixel value of the present pixel and a pixel value that is most similar to the pixel value of the present pixel among the pixel values of the previous pixels constituting the target of the previous frame in the area adjacent to the present pixel. When the information regarding the target is extracted, the information regarding the target in the present frame is also extracted based on the target-difference image.

In an exemplary implementation, in generating the target-difference image, the target-difference image is generated by modifying the pixel value of the target-difference image for the present pixel to a preset pixel value, if the target of the previous frame is not in the area adjacent to the present pixel.

In an exemplary implementation, extracting the information regarding the target further comprises generating a target-segment by dividing an area from the target-difference image based on the size of the pixel values of the pixels constituting the target-difference image, and in extracting the information regarding the target, the information regarding the target in the present frame is extracted based on the target-segment.

In an exemplary implementation, in generating the target-segment, the target-segment is generated by dividing pixels that have a pixel value less than a first pixel value from the target-difference image.

According to an exemplary embodiment of the present invention, the generation of the target-segment results in the target-segment being regenerated by dividing pixels that have a pixel value less than a second pixel value from the pixels constituting the target-segment.

In an exemplary implementation, extracting the information regarding the target comprises generating a background-difference image. The background-difference image is generated by modifying the pixel value of the present pixel to the difference between the pixel value of the present pixel and a pixel value similar to the pixel value of the present pixel among the pixel values of the previous pixels constituting the background of the previous frame in the area adjacent to the present pixel. The information regarding the target in the present frame is extracted based on the target-difference image and the background-difference image.

In an exemplary implementation, extracting the information regarding the target further comprises generating a target-segment, generating a background-segment and outputting the information regarding the target. The target-segment is generated by dividing an area from the target-difference image based on the size of the pixel values of the pixels constituting the target-difference image. A background-segment is generated by dividing an area from the background-difference image based on the size of the pixel values of the pixels constituting the background-difference image. The information regarding the target is output by excluding the pixels constituting the background-segment from the pixels constituting the target-segment.

In order to achieve the above-described aspects of exemplary embodiments of the present invention, a photographing apparatus is provided. The photographing apparatus comprises a target extractor and a tracking controller. The target extractor extracts information regarding a target in a present frame based on a similarity between a pixel value of a pixel constituting the present frame and a pixel value of a pixel among pixels constituting a target of a previous frame. The tracking controller controls automatic tracking for the target based on the information regarding the target.

According to an exemplary implementation, the target extractor comprises a first divider. The first divider generates a target-segment by dividing an area from the present frame based on the similarity between a pixel value of a pixel constituting the present frame and a pixel value of a pixel among pixels constituting a target of a previous frame. The target extractor extracts the information regarding the target based on the target-segment.

In an exemplary implementation, the target extractor further comprises a second divider for generating a background-segment by dividing another area from the present frame based on the similarity between the pixel value of the pixel constituting the present frame and the pixel value of the pixel among pixels constituting the target of the previous frame. The target extractor extracts the information regarding the target based on the target-segment and the background-segment.

According to an exemplary implementation, the target extractor further comprises a target reconstructor for outputting the information regarding the target by excluding the pixels constituting the background-segment from the pixels constituting the target-segment.

In order to achieve the above-described aspects of exemplary embodiments of the present invention, a method for controlling target tracking is provided. Information regarding a target in a present frame is extracted based on a similarity between a pixel value of a pixel constituting the present frame and a pixel value of a pixel among pixels constituting a target of a previous frame. Automatic tracking for the target is controlled based on the information regarding the target.

In an exemplary implementation, extracting information regarding the target comprises generating a target-segment by dividing an area from the present frame based on the similarity between a pixel value of a pixel constituting the present frame and a pixel value of a pixel among pixels constituting a target of a previous frame, and in extracting information regarding the target, the information regarding the target is extracted based on the target-segment.

According to an exemplary embodiment of the present invention, extracting information regarding the target further comprises generating a background-segment. The background-segment is generated by dividing another area from the present frame based on the similarity between the pixel value of the pixel constituting the present frame and the pixel value of the pixel among pixels constituting the target of the previous frame. The information regarding the target is extracted based on the target-segment and the background-segment.

In an exemplary implementation, extracting information regarding the target further comprises outputting the information regarding the target. This information is output by excluding the pixels constituting the background-segment from the pixels constituting the target-segment.

In order to achieve the above-described aspects of exemplary embodiments of the present invention, a photographing apparatus is provided. The photographing apparatus comprises a target extractor and a tracking controller. The target extractor extracts information regarding a target in a present frame by determining a target and a background in the present frame and excluding pixels determined to be the background from pixels determined to be the target. The tracking controller controls automatic tracking for the target based on the information regarding the target.

In order to achieve the above-described aspects of exemplary embodiments of the present invention, a method for controlling target tracking is provided. Information regarding a target in a present frame is extracted by determining a target and a background in the present frame and by excluding pixels determined to be the background from pixels determined to be the target. Automatic tracking for the target is controlled based on the information regarding the target.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

These and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
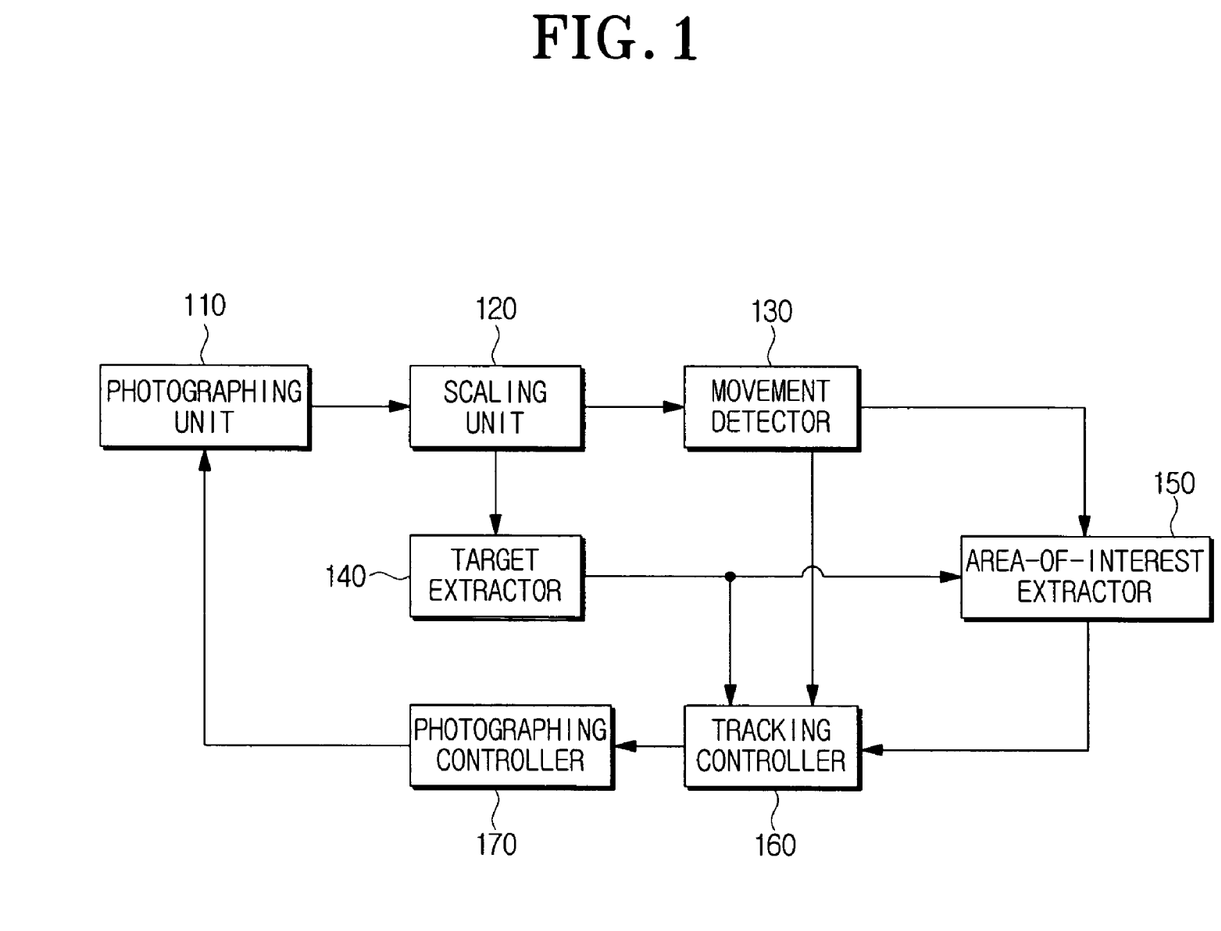
FIG. 1 is a block diagram illustrating a photographing apparatus according to an exemplary embodiment of the present invention.

FIG. 1 is a block diagram illustrating a photographing apparatus according to an exemplary embodiment of the present invention. The photographing apparatus automatically tracks a target among moving objects and continues to photograph it.

As illustrated in FIG. 1, the photographing apparatus, according to an exemplary embodiment of the present invention, comprises a photographing unit 110, a scaling unit 120, a movement detector 130, a target extractor 140, an area-of-interest extractor 150, a tracking controller 160 and a photographing controller 170.

The photographing unit 110 generates an image by taking a photograph. The generated image may be divided into a target and a background which is not the target.

The scaling unit 120 scales down the size of the image generated by the photographing unit 110. The scaling down reduces the size of the image and thus reduces the operation of the movement detector 130 and the target extractor 140. This, in turn, raises the processing rate of the movement detector 130 and the target extractor 140.

The movement detector 130 detects and outputs the moving of a target using the image scaled by the scaling unit 120.

The target extractor 140 extracts information regarding the target using the image scaled by the scaling unit 120. The process of extracting the information regarding the target in the target extractor 140 is discussed in more detail below.

The area-of-interest extractor 150 extracts an area of interest using the moving of the target output from the movement detector 130 and the information regarding the target output from the target extractor 140. Extracting the area of interest limits an area for operation of the tracking controller 160 and thus reduces the operation of the tracking controller 160, thereby increasing the processing rate.

The tracking controller 160 generates tracking control information for active contour-based automatic tracking, using the moving of the target output from the movement detector 130, the target information output from the target extractor 140 and the area of interest output from the area-of-interest extractor 150. The tracking control information comprises center point information and shape information for the target.

The photographing controller 170 controls the operation of the photographing unit 110 based on the tracking control information output from the tracking controller 160. More specifically, the photographing controller 170 controls the pan/tilt/zoom (PTZ) of the photographing unit 110 based on the tracking control information. The photographing unit 110 may take photographs by manipulating the center of the target to correspond to the center of the captured image.

Figure 2:
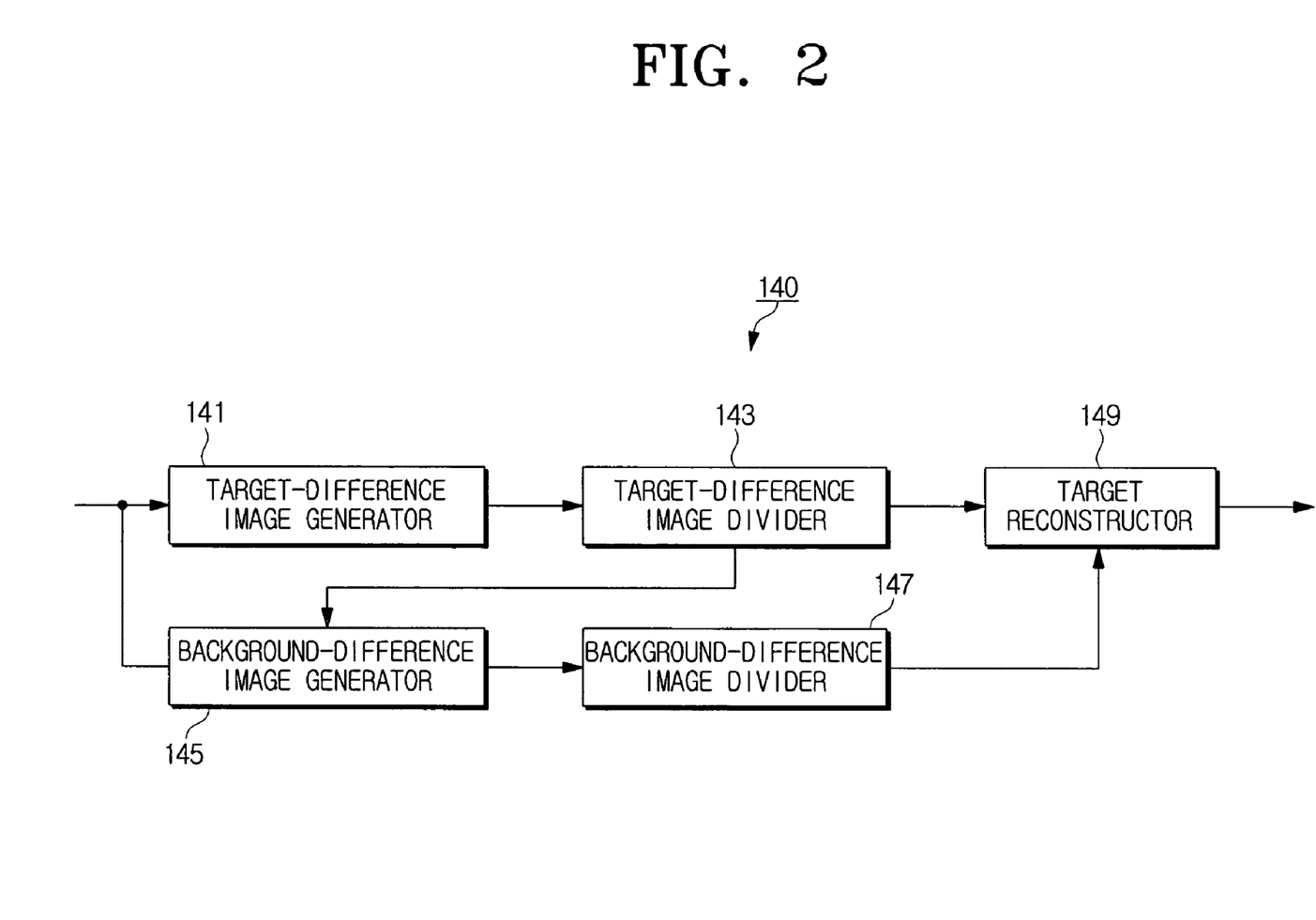
FIG. 2 is a detailed block diagram illustrating a target extractor according to an exemplary embodiment of the present invention.

The above-described target extractor 140 is discussed in greater detail with reference to FIG. 2. FIG. 2 is a detailed block diagram illustrating the target extractor 140.

The target extractor 140 extracts the target information using the image scaled down by the scaling unit 120 as described above. As illustrated in FIG. 2, the target extractor 140 comprises a target-difference image generator 141, a target-difference image divider 143, a background-difference image generator 145, a background-difference image divider 147 and a target reconstructor 149.

The target-difference image generator 141 generates a target-difference image by using the current frame and a previous frame down-scaled in the scaling unit 120. The target-difference image generator 141 achieves this by determining whether the target of the previous frame is in an area adjacent to a pixel in the present frame.

If it is determined that the target of the previous frame is in the area adjacent to the pixel in the present frame, the target-difference image generator 141 outputs the difference between the color value of the present pixel and the color value of the pixels constituting the target of the previous frame in the area adjacent to the pixel in the present frame. The target-difference image generator 141 detects the minimum value among the output differences, and modifies the luminance value of the pixel to a luminance value corresponding to the detected minimum value. The minimum value is a comparatively low value such as a value close to the luminance value of black.

Alternatively, if it is determined that the target of the previous frame is not in the area adjacent to the pixel in the present frame, the target-difference image generator 141 modifies the luminance value of the pixel to a preset luminance value. The preset luminance value is a comparatively high value such as a value close to the luminance value of white.

The target-difference image generator 141 performs the above operation for substantially all pixels constituting the present frame, and thus an image consisting of the modified luminance values corresponds to the target-difference image.

The luminance value of a pixel with the target of the previous frame in the area adjacent to the pixel is modified to the minimum value such as a luminance value close to black. The luminance value of a pixel that does not have the target of the previous frame in the area adjacent to the pixel is modified to a luminance value close to white, so that the target-difference image is generated.

The target-difference image divider 143 divides pixels that have a comparatively low luminance value from the target-difference image generated from the target-difference image generator 141 to generate a target-segment.

More specifically, the target-difference image divider 143 generates a target-segment by dividing pixels with a luminance value lower than the first luminance value from the pixels constituting the target-difference image. The first luminance value may be determined based on the average luminance value of the target-difference image.

The target-segment consists of pixels with a "comparatively low" luminance value in the target-difference image, and thus consists of pixels that have a "comparatively similar" color to the target of the previous frame.

For example, the target-difference image divider 143 generates the target-segment by dividing pixels in which the color values of the pixels constituting the area of the present frame which is determined to be the target are comparatively similar to the color value of one pixel among the pixels constituting the target of the previous frame.

The target-difference image divider 143 may regenerate a target-segment by dividing pixels that have a luminance value lower than a second luminance value from pixels constituting the generated target-segment. The second luminance value is lower than the first luminance value.

If the target-segment is regenerated, the target-segment consists of pixels with a "lower" luminance value in the target-difference image, and accordingly consists of pixels that have a "more similar" color to the target of the previous frame.

The background-difference image generator 145 generates a background-difference image using the current frame and a previous frame scaled down in the scaling unit 120. The background-difference image generator 145 determines whether the background of the previous frame is in an area adjacent to a pixel in the present frame.

If the background of the previous frame is in the area adjacent to the pixel in the present frame, the background-difference image generator 145 outputs the difference between the color value of the present pixel and the color value of the pixels constituting the background of the previous frame in the area adjacent to the pixel in the present frame. The background-difference image generator 145 detects the minimum value among the output differences, and modifies the luminance value of the pixel to a luminance value corresponding to the detected minimum value. The minimum value is a comparatively low value such as a value close to the luminance value of black.

Alternatively, if it is determined that the background of the previous frame is not in the area adjacent to the pixel in the present frame, the background-difference image generator 145 changes the luminance value of the pixel to a preset luminance value. The preset luminance value is a comparatively high value such as a value close to the luminance value of white.

The background-difference image generator 145 performs the above operation for substantially all pixels constituting the present frame, and thus an image consisting of the modified luminance values corresponds to the background-difference image.

The luminance value of a pixel with the background of the previous frame in the area adjacent to the pixel is modified to the minimum value such as a luminance value close to black. The luminance value of a pixel that does not have the background of the previous frame in the area adjacent to the pixel is modified to a luminance value close to white, so that the background-difference image is generated.

According to an exemplary implementation, the background-difference image is generated by the background-difference image generator 145 which may use the target-segment for the previous frame output from the target-difference image divider 143. More specifically, the background-difference image generator 145 can perform the above operation by assuming that the area excluding the target-segment of the previous frame from the previous frame is the background of the previous frame.

The background-difference image divider 147 divides pixels that have a comparatively low luminance value from the background-difference image generated from the background-difference image generator 145 so that a background-segment may be generated.

More specifically, the background-difference image divider 147 generates a background-segment by dividing pixels comprising a luminance value lower than a third luminance value from the pixels constituting the background-difference image. The third luminance value may be determined based on the average luminance value of the background-difference image. Additionally, the third luminance value may be the same as the first luminance value.

The background-segment consists of pixels comprising a "comparatively low" luminance value in the background-difference image, and thus consists of pixels comprising a "comparatively similar" color to the background of the previous frame.

For example, the background-difference image divider 147 generates the background-segment by dividing pixels in which the color values of the pixels constituting the area of the present frame which is determined to be the background are comparatively similar to the color value of one pixel among the pixels constituting the background of the previous frame.

The background-difference image divider 147 may regenerate a background-segment by dividing pixels comprising a luminance value lower than a fourth luminance value from pixels constituting the generated background-segment. The fourth luminance value is lower than the third luminance value. Additionally, the fourth luminance value may be the same as the second luminance value.

If the background-segment is regenerated, the background-segment consists of pixels comprising a "lower" luminance value in the background-difference image, and accordingly consists of pixels comprising a "more similar" color to the background of the previous frame.

The target reconstructor 149 outputs information regarding pixels which excludes pixels constituting the background-segment output from the background-difference image divider 147 from pixels constituting the target-segment output from the target-difference image divider 143, as target information of the present frame.

The target is reconstructed to exclude pixels constituting the target-segment but which originally correspond to the background from the target-segment.

Figure 3:
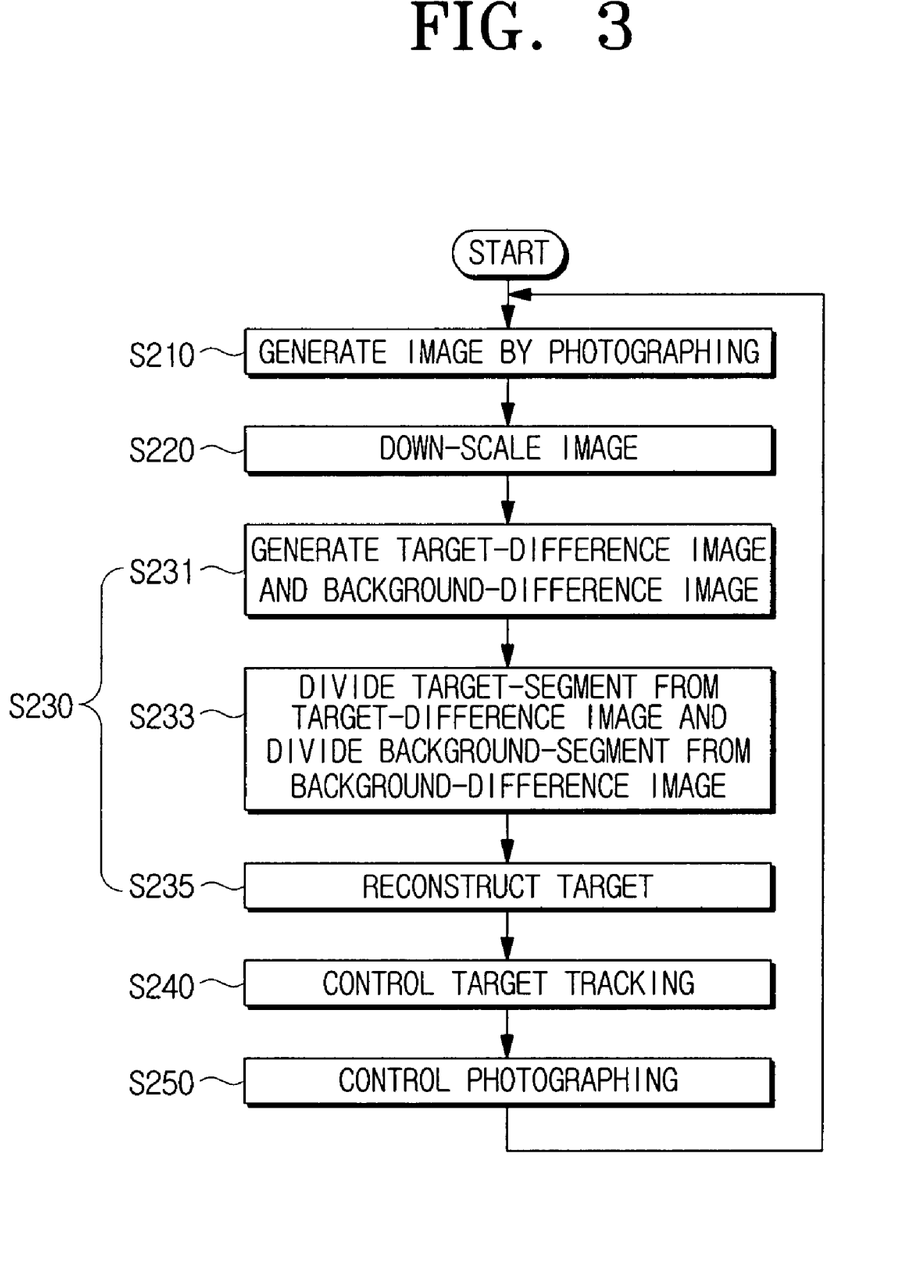
FIG. 3 is a flow chart illustrating a method for controlling target tracking according to an exemplary embodiment of the present invention.

The process of operating the photographing apparatus according to an exemplary embodiment of the present invention is discussed below. FIG. 3 is a flow chart illustrating a method for controlling target tracking according to an exemplary embodiment of the present invention.

As illustrated in FIG. 3, the photographing unit 110 generates an image by taking a photograph in step 210. The scaling unit 120 then scales down the generated image in step 220.

Subsequently, the target extractor 140 extracts target information using the scaled down image in step 230. This process is described in greater detail below.

In step 231, the target-difference image generator 141 generates a target-difference image and the background-difference image generator 145 generates a background-difference image so that target information may be extracted.

As discussed above, a luminance value of a pixel comprising the target of the previous frame in the area adjacent to the pixel is modified to the minimum value such as a luminance value close to black. A luminance value of a pixel that does not comprise the target of the previous frame in the area adjacent to the pixel is modified to a luminance value close to white, so that the target-difference image is generated. The minimum value is also described as the lowest value among differences between the pixel and each color value of pixels constituting the target of the previous frame in the area adjacent to the pixel in the present frame.

As discussed above, the luminance value of a pixel comprising the background of the previous frame in the area adjacent to the pixel is modified to the minimum value such as a luminance value close to black, and the luminance value of a pixel not comprising the background of the previous frame in the area adjacent to the pixel is modified to a luminance value close to white, so that the background-difference image is generated. The minimum value is also described as the lowest value among differences between the pixel and each color value of pixels constituting the background of the previous frame in the area adjacent to the pixel in the present frame.

More specifically, the target-difference image and the background-difference image may be generated using Equation 1 below. According to an exemplary implementation, the target-difference image and the background-difference image are collectively referred to as a difference image.

[Equation 1]

$$I_R(\vec{x}) = \begin{cases} \inf_{\{\vec{z}: |\vec{z}| \leq \delta, \vec{x}+\vec{z} \in Rx\}} \dfrac{\sum_{color=R,G,B} [I^{n+1}_{color}(\vec{x}) - I^{n}_{color}(\vec{x}+\vec{z})]^2}{\sigma^2} & \text{if } \vec{x}+\vec{z} \in Rx \\ K\left(k > 3X\dfrac{255^2}{\sigma^2}\right) & \text{if } \vec{x}+\vec{z} \notin Rx \end{cases}$$

where $I_R(\vec{x})$ is the luminance value of a pixel constituting the different image, $\vec{x}$ is the present pixel, $I_{color}^{n+1}(\vec{x})$ is the color value of the present pixel in the present frame, $\vec{x}+\vec{z}$ is a pixel in the area adjacent to the present pixel, $I_{color}^{n}(\vec{x}+\vec{z})$ is the color value of the pixel of the adjacent area in the previous frame, $\delta$ is the size of the adjacent area, $\sigma^2$ is the luminance variance in the adjacent area, Rx is the target (or the background) in the previous frame, K is the constant that is higher than $$3X\dfrac{255^2}{\sigma^2}.$$

As illustrated by Equation 1, if the target (or the background) of the previous frame in the area adjacent to a present pixel is in the present frame (if $\vec{x}+\vec{z} \in Rx$), the luminance value of a pixel constituting the different image $I_R(\vec{x})$ is a value $$\left(\inf_{\{\vec{z}: |\vec{z}| \leq \delta, \vec{x}+\vec{z} \in Rx\}} \dfrac{\sum_{color=R,G,B} [I^{n+1}_{color}(\vec{x}) - I^{n}_{color}(\vec{x}+\vec{z})]^2}{\sigma^2}\right)$$

output by dividing the minimum value, among differences between the pixel and each color value of pixels constituting the target (or background) of the previous frame in the area adjacent to the pixel in the present frame, by the luminance variance in the adjacent area. According to an exemplary implementation, the output value is close to black.

Alternatively, if the target (or the background) of the previous frame is not in the area adjacent to a present pixel in the present frame ($\vec{x}+\vec{z} \notin Rx$), the luminance value of a pixel constituting the different image $I_R(\vec{x})$ is K, which is close to white. This is illustrated in Equation 1.

Subsequently, in step 233, the target-difference image divider 143 divides and generates a target-segment from the target-difference image, and the background-difference image divider 147 divides and generates a background-segment from the background-difference image.

As discussed above, the target-difference image divider 143 divides pixels that comprise a comparatively low luminance value from the target-difference image to generate a target-segment. The background-difference image divider 147 divides pixels comprising a comparatively low luminance value from the background-difference image to generate a background-segment.

More specifically, the target-segment and the background-segment may be generated using the sign φ determining inequality, in which the energy function E(φ) illustrated in Equation 2 is minimized. According to an exemplary implementation, the target-segment and the background-segment are collectively referred to as a segment.

[Equation 2]

$$E(\phi) = +\lambda_1 \int_\Omega |u_0(\vec{r}) - ave\{\phi > 0\}|^2 \phi(\vec{r}) H(\alpha + \phi(\vec{r})) d\vec{r} - \lambda_2 \int_\Omega |u_0(\vec{r}) - ave\{\phi < 0\}|^2 \phi(\vec{r}) H(\alpha - \phi(\vec{r})) d\vec{r}$$

where $\vec{r}$ is the individual pixel constituting the different image, $u_0(\vec{r})$ is the luminance value of the pixel, ave{ϕ>0} is the average luminance value in the area of ϕ>0, ave{ϕ<0} is the average luminance value in the area of ϕ<0, H is the Heaviside function, and $\lambda_1$, $\lambda_2$ and α are the variable parameters.

In Equation 2, ϕ minimizes an energy function E(ϕ) and may be operated using Equation 3.

$$\frac{\partial \phi}{\partial t} = \left|\frac{\partial H(\phi)}{\partial \phi}\right| \left[\nabla \cdot \left(\frac{\nabla \phi}{|\nabla \phi|}\right) - \lambda_1 (u_0(\vec{r}) - ave\{\phi > 0\})^2 + \lambda_2 (u_0(r) - ave\{\phi < 0\})^2\right]$$
$$= 0$$

[Equation 3]

ϕ satisfies a partial differential equation of Equation 3. In Equation 3, the energy function E(ϕ) is minimized. A pixel comprising a "+" sign of inequality of ϕ satisfying a partial differential equation of Equation 3 is divided into segments. However, a pixel comprising a "−" sign of inequality of ϕ satisfying a partial differential equation of Equation 3 is not divided into segments.

As discussed above, a segment may be re-divided to regenerate a segment.

After step 233, the target reconstructor 149 outputs information regarding pixels which excludes pixels constituting the background-segment output from the background-difference image divider 147 from pixels constituting the target-segment output from the target-difference image divider 143, as target information of the present frame, in step 235.

Subsequently, in step 240, the tracking controller 160 generates tracking control information for active contour based automatic tracking. This information is generated by using the movement of the target output from the movement detector 130, the target information output from the target extractor 140 and the area of interest output from the area-of-interest extractor 150. The photographing controller 170 controls the operation of the photographing unit 110 based on the tracking control information in step 250.

Accordingly, the photographing apparatus according to an exemplary embodiment of the present invention automatically tracks a single target among moving objects and continues to capture it.

According to an exemplary embodiment of the present invention, a target is more precisely extracted using an image difference generated by comparing the target and background of the current frame and previous frame.

According to another exemplary embodiment of the present invention, a target is more precisely extracted based on the similarity of the target and background of the current frame and previous frame.

According to yet another exemplary embodiment of the present invention, a target is more precisely extracted by excluding an area determined to be a background from an area determined as a target in the current frame.

The present invention can also be embodied as computer readable codes on a computer readable recording medium. The computer readable recording medium is an data storage device that can store data which can thereafter be read by a computer system. Examples of the computer readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer readable recording medium can also be distributed over network-coupled computer systems so that the computer readable code is stored and executed in a distributed fashion. Also, functional programs, codes and code segments for accomplishing the present invention can be easily construed as within the scope of the invention by programmers skilled in the art to which the invention pertains.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A photographing apparatus comprising:
   a processor;
   a target extractor which extracts target information about a target in a present frame based on information regarding a difference between a first pixel value of a first pixel of the present frame and each of respective first pixel values of a plurality of target pixels, constituting the target in a previous frame, in an area adjacent to the first pixel of the present frame; and
   a tracking controller which controls automatic tracking of the target based on the target information,
   wherein the target extractor comprises a target-difference image generator which generates a target-difference image by modifying a second pixel value of the first pixel of the present frame to a value corresponding to a difference between the first pixel value of the first pixel and a first pixel value, among the respective first pixel values of the plurality of target pixels, which is the most similar to the first pixel value of the first pixel of the present frame, and
   wherein the target extractor extracts the target information in the present frame based on the target-difference image.

2. The photographing apparatus of claim 1, wherein the target-difference image generator generates the target-difference image by modifying the second pixel value of the first pixel to a preset value, if the target in the previous frame is not in the area adjacent to the first pixel.

3. The photographing apparatus of claim 1, wherein the target extractor further comprises a target-difference image divider which generates a target segment of the target by dividing an area of the target-difference image based on second pixel values of pixels constituting the target-difference image, and
   wherein the target extractor extracts the target information in the present frame based on the target segment.

4. The photographing apparatus of claim 3, wherein the target-difference image divider generates the target segment comprising pixels having a second pixel value less than a first value from the target-difference image.

5. The photographing apparatus of claim 4, wherein the target-difference image divider regenerates the target segment comprising pixels having a second pixel value less than a second value from the pixels constituting the target segment.

6. The photographing apparatus of claim 1,
   wherein the target extractor comprises a background-difference image generator which generates a background-difference image by modifying a first pixel value of a second pixel of the present frame to a difference between the first pixel value of the second pixel and a first pixel value, among respective first pixel values of a plurality of background pixels constituting a background in the previous frame in an area adjacent to the second pixel, which is the most similar to the first pixel value of the second pixel of the present frame, and wherein the target extractor extracts the target information in the present frame based on the target-difference image and the background-difference image.

7. The photographing apparatus of claim 6, wherein the target extractor further comprises:

a target-difference image divider which generates a target segment of the target by dividing an area of the target-difference image based on second pixel values of pixels constituting the target-difference image;

a background-difference image divider which generates a background segment of the background by dividing an area of the background-difference image based on second pixel values of pixels constituting the background-difference image; and a target reconstructor which outputs the target information by excluding the pixels constituting the background segment from the pixels constituting the target segment.

8. The photographing apparatus of claim 1, wherein the difference is obtained with respect to substantially all first pixels, including the first pixel, of the present frame.

9. A method for controlling target tracking using a photographing apparatus comprising a processor, the method comprising:

extracting, under control of the processor, target information about a target in a present frame based on information regarding a difference between a first pixel value of a first pixel of the present frame and each of respective first pixel values of a plurality of target pixels, constituting the target in a previous frame, in an area adjacent to the first pixel of the present frame; and automatically tracking the target based on the target information, wherein the extracting the target information comprises generating a target-difference image by modifying a second pixel value of the first pixel of the present frame to a value corresponding to a difference between the first pixel value of the first pixel and a first pixel value, among the respective first pixel values of the plurality of target pixels, which is the most similar to the first pixel value of the first pixel of the present frame, and wherein, in the extracting the target information, the target information in the present frame is extracted based on the target-difference image.

10. The method of claim 9, wherein in the generating the target-difference image, the target-difference image is generated by modifying the second pixel value of the first pixel to a preset value, if the target in the previous frame is not in the area adjacent to the first pixel.

11. The method of claim 9, wherein the extracting the target information further comprises generating a target segment of the target by dividing an area of the target-difference image based on second pixel values of pixels constituting the target-difference image, and wherein in the extracting the target information, the target information in the present frame is extracted based on the target segment.

12. The method of claim 11, wherein in the generating the target segment of the target, the target segment is generated by dividing pixels having a second pixel value less than a first value from the target-difference image.

13. The method of claim 12, wherein in the generating the target segment of the target, the target segment is regenerated by dividing pixels having a second pixel value less than a second value from the pixels constituting the target segment.

14. The method of claim 9, wherein extracting the target information comprises generating a background-difference image by modifying a first pixel value of a second pixel of the present frame to a difference between the first pixel value of the second pixel and a first pixel value, among respective first pixel values of a plurality of background pixels constituting a background in the previous frame in an area adjacent to the second pixel, which is the most similar to the first pixel value of the second pixel of the present frame, and wherein, in extracting the target information, the target information in the present frame is extracted based on the target-difference image and the background-difference image.

15. The method of claim 14, wherein the extracting the target information further comprises:

generating a target segment of the target by dividing an area of the target-difference image based on second pixel values of pixels constituting the target-difference image;

generating a background segment of the background by dividing an area of the background-difference image based on second pixel values of pixels constituting the background-difference image; and outputting the target information by excluding the pixels constituting the background segment from the pixels constituting the target segment.

16. The method of claim 9, wherein the difference is obtained with respect to substantially all first pixels, including the first pixel, of the present frame.

17. A photographing apparatus comprising:

a processor;

a target extractor which, under control of the processor, extracts target information about a target in a present frame based on a similarity between a first pixel value of a first pixel of the present frame and each of respective first pixel values of a plurality of target pixels constituting the target in a previous frame, in an area adjacent to the first pixel of the present frame; and a tracking controller which controls automatic tracking of the target based on the target information, wherein the target extractor comprises a first divider which generates a target segment of the target by dividing an area of the present frame based on the similarity, wherein the target extractor extracts the target information based on the target segment wherein the target extractor further comprises a second divider which generates a background segment of a background by dividing another area of the present frame based on a similarity between a first pixel value of a second pixel of the present frame and each of respective first pixel values of a plurality of background pixels constituting the background in the previous frame in an area adjacent to the second pixel; and wherein the target extractor extracts the target information based on the target segment and the background segment.

18. The photographing apparatus of claim 17, wherein the target extractor further comprises a target reconstructor which outputs the target information by excluding pixels constituting the background segment from pixels constituting the target segment.

19. A method for controlling target tracking using a photographing apparatus comprising a processor, the method comprising:

extracting, under control of the processor, target information about a target in a present frame based on a similarity between a first pixel value of a first pixel of the present frame and each of respective first pixel values of a plurality of target pixels constituting the target in a previous frame, in an area adjacent to the first pixel of the present frame; and controlling automatic tracking of the target based on the target information, wherein extracting the target information comprises generating a target segment of the target by dividing an area of the present frame based on the similarity, wherein the target information is extracted based on the target segment wherein extracting the target information further comprises generating a background segment of a background by dividing another area of the present frame based on a similarity between a first pixel value of a second pixel of the present frame and each of respective first pixel values of a plurality of background pixels constituting the background in the previous frame in an area adjacent to the second pixel; and wherein the target information is extracted based on the target segment and the background segment.

20. The method of claim 19, wherein extracting the target information further comprises outputting the target information by excluding pixels constituting the background segment from pixels constituting the target segment.

21. A non-transitory computer-readable medium having embodied thereon a computer program for executing a method of controlling target tracking, the method comprising:

extracting, under control of the processor, target information about a target in a present frame based on information regarding a difference between a first pixel value of a first pixel of the present frame and each of respective first pixel values of a plurality of target pixels, constituting the target in a previous frame, in an area adjacent to the first pixel of the present frame; and automatically tracking the target based on the target information, wherein the extracting the target information comprises generating a target-difference image by modifying a second pixel value of the first pixel of the present frame to a value corresponding to a difference between the first pixel value of the first pixel and a first pixel value, among the respective first pixel values of the plurality of target pixels, which is the most similar to the first pixel value of the first pixel of the present frame, and wherein, in the extracting the target information, the target information in the present frame is extracted based on the target-difference image.

22. A non-transitory computer-readable medium having embodied thereon a computer program for executing the method of controlling target tracking, the method comprising:

extracting, under control of the processor, target information about a target in a present frame based on a similarity between a first pixel value of a first pixel of the present frame and each of respective first pixel values of a plurality of target pixels constituting the target in a previous frame, in an area adjacent to the first pixel of the present frame; and controlling automatic tracking of the target based on the target information, wherein the extracting the target information comprises generating a target segment of the target by dividing an area of the present frame based on the similarity, wherein the target information is extracted based on the target segment, wherein extracting the target information further comprises generating a background segment of a background by dividing another area of the present frame based on a similarity between a first pixel value of a second pixel of the present frame and each of respective first pixel values of a plurality of background pixels constituting the background in the previous frame in an area adjacent to the second pixel; and wherein the target information is extracted based on the target segment and the background segment.

* * * * *